Nov. 2, 1954
D. O. JOHNSON ET AL
2,693,336
AUTOMATIC FILLING AND WEIGHING MACHINE
Filed April 12, 1949
2 Sheets-Sheet 1
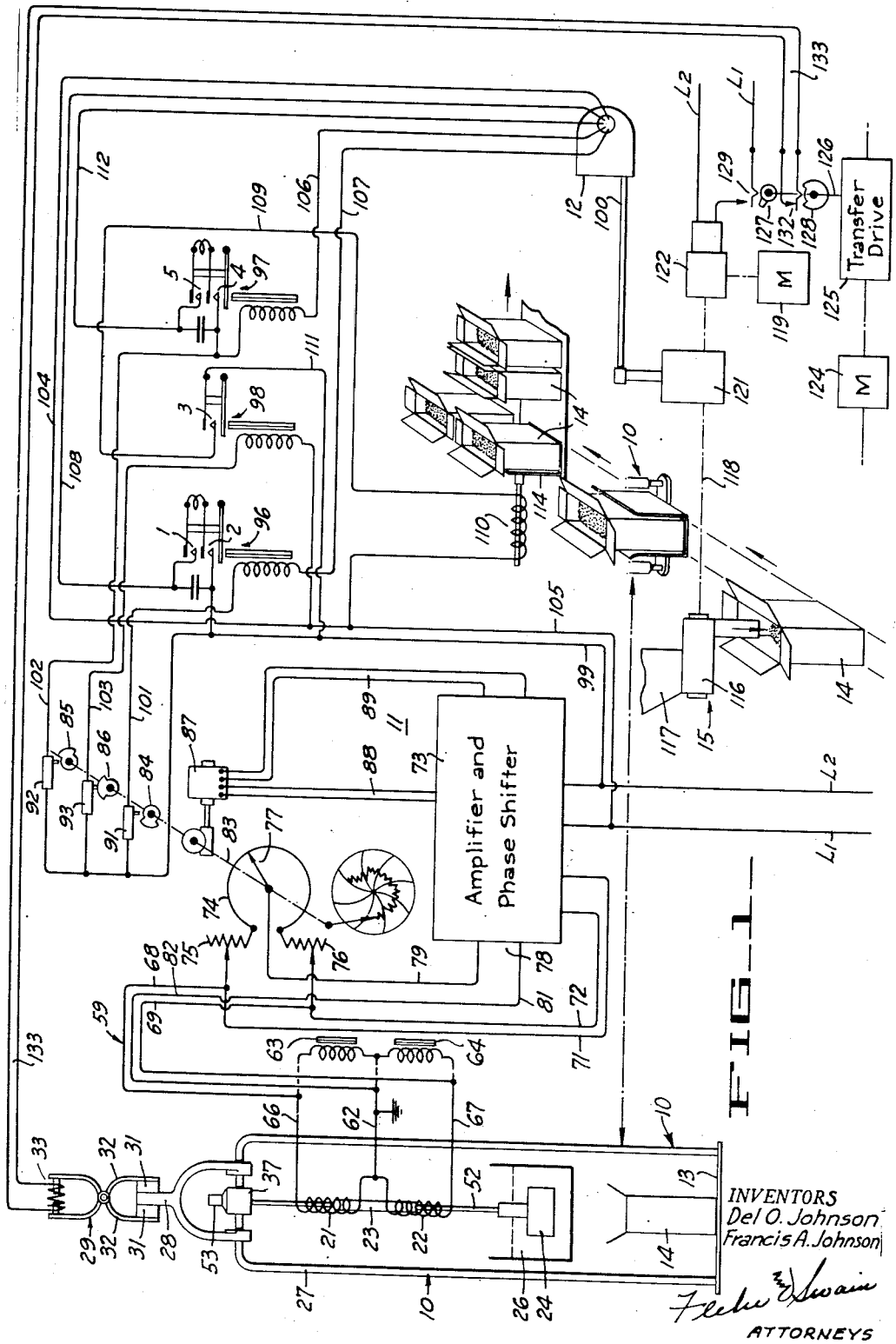
INVENTORS
Del O. Johnson
Francis A. Johnson
ATTORNEYS

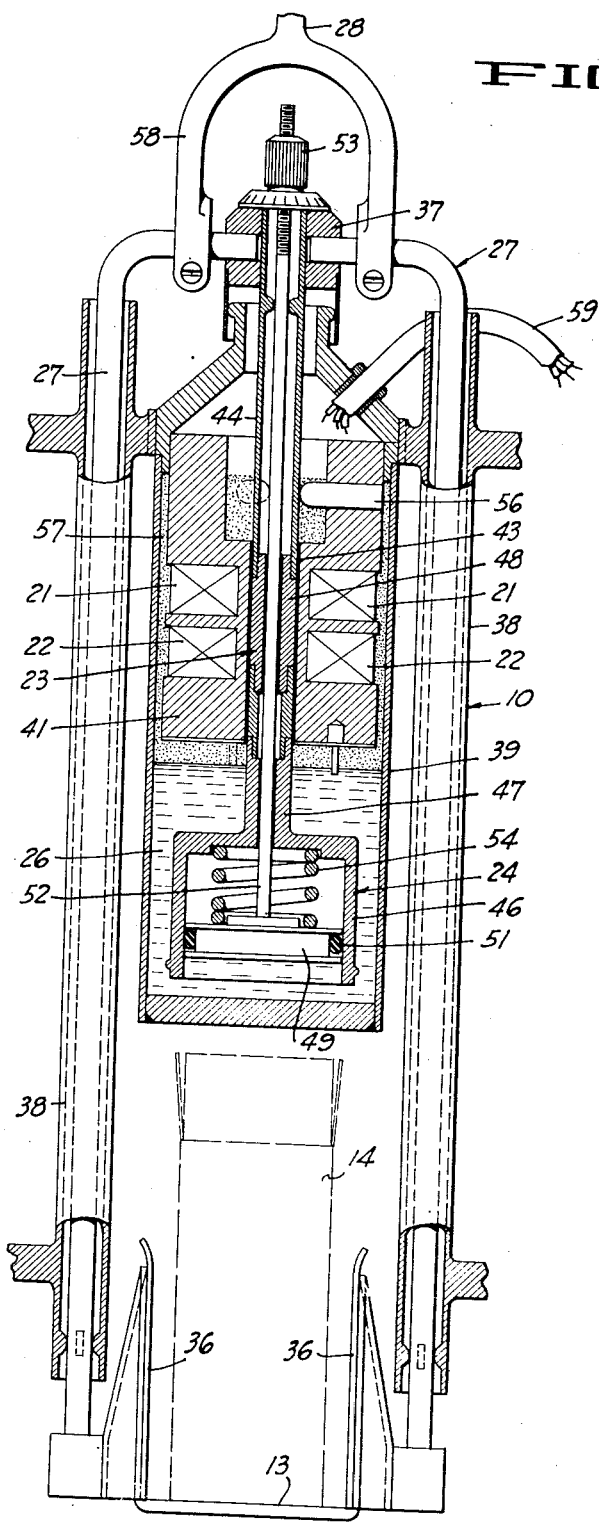

United States Patent Office 2,693,336
Patented Nov. 2, 1954

2,693,336

AUTOMATIC FILLING AND WEIGHING MACHINE

Del O. Johnson and Francis A. Johnson, Loleta, Calif., assignors, by mesne assignments, to Foremost Dairies, Inc., Oakland, Calif., a corporation of New York Application April 12, 1949, Serial No. 86,886

6 Claims. (Cl. 249—59)

This invention relates generally to automatic filling and weighing machines of the type suitable for introducing predetermined quantities of powdered material into cartons.

It is an object of the invention to provide a machine of the above character capable of regulating and controlling the amount of material delivered to each carton to a relatively high degree of accuracy.

It is another object of the invention to provide an automatic machine of the above character capable of effecting continual compensation to correct inaccuracies in the filling operation, and which is not subject to overcorrection or hunting.

Another object of the invention is to provide a machine of the above character having a novel type of weighing means for effecting automatic control of the filling operation, the weighing means being characterized by the use of an electrical bridge of the inductive impedance type.

Additional objects and features of the invention include the provision of hydrostatic float means for the weighing operation; an arrangement for preventing balancing movement of the float except when a carton is on the weighing platform; the use of phase shifting means in conjunction with an electrical system which is responsive to the weighing operation; and the use of a special relay control system for controlling motive means, which in turn serves to automatically adjust the filling operation.

Another object of the invention is to provide a machine of the above character having means whereby an empty carton, or one which is greatly underweight, does not cause an automatic correction to be made in the filling operation, and in which means is provided to automatically reject such a carton.

Additional objects of the invention will appear from the following description in which the preferred embodiment has been set forth in detail in conjunction with the accompanying drawing.

Referring to the drawing:

Figure 1 is a circuit diagram schematically illustrating a complete machine incorporating the present invention, together with circuit connections for the various electrical parts.

Figure 2 is a side elevational view partly in section illustrating the weighing unit incorporated in the machine of Figure 1.

The machine as diagrammatically illustrated in Figure 1 consists of a weighing unit 10 which is connected by the electrical network 11 to the motor device 12. Referring particularly to the lower right hand portion of Figure 1, the weighing unit 10 is positioned in the conveying line for the cartons 14. The position of the weighing unit 10 can be referred to as the weighing station, and at a point in advance of the weighing unit 10 there is a powder filling station represented by the powder filling means 15. Suitable conveying or transfer means is employed for moving the cartons from one station to the next, with the stations being located a predetermined distance apart. Such means (not illustrated) may be a conventional type of mechanism such as is utilized for other types of carton filling machines, and it should be characterized by periodic advancement of the cartons from one position to the next, with the positions or stations being an equal distance apart.

Referring first to the weighing unit 10 as diagrammatically illustrated in Figure 1, it consists of a pair of induction coils 21 and 22 arranged coaxially, and associated with the coaxial magnetic armature 23. The lower end of the armature is attached to a float 24 which is disposed within a mercury bath 26. The armature is attached to a frame 27, which in turn is secured to platform 13. A tongue 28 is attached to the frame 27, and is adapted to be engaged by the magnetic gripping device 29. This device is secured to a suitable stationary support (not shown), and may consist for example of the opposed gripping members 31, which are carried by the scissors-like fulcrumed levers 32. These levers are actuated to force the members 31 in gripping engagement with the tongue 28, by energizing the solenoid coil 33.

A desirable construction for the weighing unit 10 is illustrated in Fig. 2 and is as follows: Platform 13 is provided with spaced vertical guides 36 to facilitate positioning of the package to be weighed. The frame 27 is constructed from metal rods which are attached at their lower ends to the platform 13, and which are secured together at their upper ends by the member 37. The vertical portions of these rods extend through guide tubes 38, which are attached to suitable support means (not shown). Located above the platform 13 and between the guide tubes 38, there is a housing or shell 39, which serves to enclose certain parts of the weighing means. The lower part of this shell forms a container for the mercury bath 26. Above the mercury bath there is a mounting 41 for the two coils 21 and 22, and which is of nonmagnetic material. Coil mounting 41 is provided with a vertical central opening 43 which extends axially through the two coils 21 and 22. A tube 44 has its upper end attached to the member 37, and extends downwardly through the opening 43.

The float 24 consists of a hollow cylindrical member 46, which has a lower hollow end, and which is attached to a cylindrical member 47 extending above the level of the mercury 26. Member 47 in turn is attached to the lower end of the tube 44. Interposed as a section in the tube 44, there is a magnetic core or armature 48.

In order to facilitate adjusting the volumetric displacement of the float 24 for a given position of the same, it is fitted with a piston 49, which in turn is sealed with respect to the cylindrical member 46 by means of the resilient O ring 51. Ths piston is attached to the lower end of a rod 52, and the rod extends upwardly through the tube 44 and beyond the upper end of member 37, and is threaded to receive the adjusting nut 53. Compression spring 54 normally urges the piston 49 downwardly. It will be apparent that upon turning the nut 53 the rod 52 can be raised or lowered relative to the tube 44, thus raising or lowering the piston 49 to adjust the volumetric dsplacement of the float.

The tube 44 is free to move a limited distance in a vertical direction relative to the shell 39 and the guide tubes 38. Suitable guide means is provided to facilitate such movement without friction, as for example the members 56 which extend inwardly from the mounting 41 to contact the tube 44 at three or more circumferentially spaced points. It is desirable to submerge the coils 21 and 22, and also the lower part of the tube 44 in a bath 57 of suitable oil. Because of its lighter gravity this oil remains upon the surface of the mercury.

As illustrated in Fig. 2, the tongue 28 can be formed as the upper end of a yoke 58, which is attached to the upper end of the frame 27. As previously pointed out in connection with Fig. 1, the tongue 28 cooperates with the magnetic gripping device 29, for a purpose to be presently described. The various electrical leads from the coils 21 and 22 are extended to form the flexible conductor cable 59, which extends to the electronic network.

It will be evident from Fig. 2 that when a package containing a predetermined amount of powder is brought to rest upon the platform 13, and the tongue 28 is released, the platform, together with frame 27, tube 44, magnetic armature 48, and the float 24, assumes a balanced position in which the mercury displaced by the float will be equal to the weight of the package, plus the weight of the platform 13 and the unsubmerged movable parts attached to the same. For the optimum carton weight desired the armature 48 can be made to take a mean position between the coils 21 and 22, by proper adjustment of the nut 53. When an underweight package is placed upon the platform 13, the armature 48 will take a raised position whereby the inductive reactance of the coil 21 is effectively increased, while the reactance of the coil 22 is reduced. Conversely when an overweight package is placed upon the platform 13, the inductive reactance of coil 21 is effectively reduced, and that of coil 22 is increased.

Referring again to Figure 1, the particular type of electron network shown is desirable, and is as follows: The two inductances 21 and 22 form inductive elements of an impedance bridge. This bridge includes the center grounded conductor 62 which is connected to the point of common connection between the coils 21 and 22, and the two external inductances 63 and 64, which likewise have one terminal each connected with conductor 62. Conductors 66 and 67 connect terminals of inductances 21 and 22 to corresponding terminals of inductances 63 and 64 to complete the bridge. It will be evident that when this bridge is excited with alternating current, movement of the armature 23 will alter the balance of the bridge in one direction or the other.

The conductors 66 and 67 are connected to the conductors 68 and 69 of the cable 59, which in turn connect with the conductors 71 and 72 leading to the amplifier and phase shifter 73. Actually conductors 71 and 72 connect to a source of alternating exciting current supplied by the amplifying phase shifter 73, whereby 60 cycle alternating voltage is applied across the conductors 66 and 67 of the bridge.

In order to provide a null type of balancing action for the bridge, an additional resistor 74 is provided, which in effect forms a part of a compensating potentiometer, and which has its terminals connected through adjustable trimming resistors 75 and 76, to the conductors 71 and 72. In other words the terminals of resistor 74 are connected through the resistors 75 and 76, to the conductors 66 and 67. A control signal circuit 78 extends from the amplifier and phase shifter 73, and includes the conductors 79 and 81, which are connected respectively to the contact arm 77, and to the conductor 82 of the cable 59. Conductor 82 connects with the grounded conductor 62 of the bridge.

The contact arm 77 is attached to a shaft 83, which also carries the cams 84, 85 and 86. Shaft 83 is positioned by a special motor 87, which is connected by two circuits 88 and 89 to the amplifier and phase shifter 73. The one circuit 88 supplies 60 cycle (reference phase) alternating current to the motor, while the other circuit 89 likewise supplies 60 cycle alternating current to the motor, but the phase of this current relative to the phase of current in circuit 88 varies to effect rotation of the motor 87 in one direction or the other. When the two circuits are in phase, the motor remains stationary. Rotation occurs when the two currents are out of phase. Motor 87 may be of the type made by Barber-Coleman Company, and reversible in response to phase changes as described above.

Suitable switches 91, 92 and 93 are provided in conjunction with the cams 84, 85 and 86. These switches are included in a circuit including the relay switches 96, 97 and 98. One terminal of each of the switches 91, 92 and 93 connects to a common conductor 99, which leads to one of the (A. C.) current supply conductors L1, L2. The other terminals of each of the switches 91, 92 and 93 are connected respectively by conductors 101, 102 and 103, to terminals of the winding of relays 96, 97 and 98 respectively.

The motor device 12 is also connected to the relays 96, 97 and 98, and can be of the type commonly referred to as a servomotor, and which serves to position a rod 100 or like member between specified limiting positions. Such a servomotor is manufactured by Stokes & Smith Company, and is known by manufacturer's specifications as Diehl Type FPE. One conductor 104 leading from the motor 12 connects to one terminal of the winding for relay 98, and also to the conductor 105, which leads to the current supply line L1. Another lead conductor 106 connects with the winding of relay 97. Another conductor 107 connects with one terminal of the winding relay 96.

Relay 96 has two sets of contacts numbered 1 and 2. Relay 98 has one set of contacts 3 and relay 97 has two sets of contacts 4 and 5. The stationary contact of the set 1 connects with conductor 108, leading from the motor 12, and the stationary contact of set 2 connects with the conductor 99, leading from one terminal of switch 91. The movable contacts of the sets 1 and 2 are connected together by an inductance, and the stationary contacts are shunted by a condenser.

The stationary contact of set 3 is connected by conductor 109 to one terminal of the solenoid 110, the other terminal of which connects with the conductor 105 and line L1.

The movable contact of set 3 is connected by conductor 111 to conductor 99, and thence to the line L2.

The stationary contact of set 4 connects to the conductor 102, which leads from switch 92, and the stationary contact of set 5 connects to a conductor 112, which also leads from the motor 12. The two movable contacts of the sets 4 and 5 are connected together by a phase shifting inductance, and the stationary contacts are connected by a condenser. Contact sets 1 and 2 are closed when the relay 96 is energized. Contact sets 4 and 5 of relay 97 are closed when its winding is de-energized, and opened when energized. Contact set 3 opens when relay 97 is energized.

Solenoid 110 when energized serves to operate the member 114, which in turn serves to reject a carton out of the normal conveying line. As will be presently explained the system is operated in such a manner that solenoid 110 is energized as a greatly underweight carton passes in position adjacent the member 114.

The powder feed means 15 at the filling station is of such a character that it is adjusted by movements of the rod 100. The diagrammatically illustrated feed means 15 includes a feed screw 116, at the lower end of the hopper spout 117. The feed screw is driven by shaft 118, which in turn is connected to the electric motor 119 through the variable ratio drive 121, and the solenoid operated clutch 122. The clutch can be of the cycling type whereby when tripped the shaft 118 is driven a predetermined number of revolutions to supply a predetermined amount of powder to the carton. The operating member of the variable ratio drive 121 is connected to rod 100, whereby when rod 100 is adjusted, the ratio of the drive 121 is adjusted accordingly. Thus the number of revolutions imparted to the feed screw 116 for each actuation of the clutch 121, is automatically adjusted by the motor 12.

Motor 124 represents the motive means for the transfer drive 125, which in turn operates the transfer mechanism (not shown) for moving the cartons along step by step. The solenoid of the clutch 122 is operated in timed relationship to the transfer mechanism. For this purpose there is shown a shaft 126 extending from the transfer drive 125, and provided with the cams 127 and 128. Cam 127 serves to cyclically close the contacts 129, which are included in the control circuit 131 for the solenoid of clutch 122. Cam 128 serves to operate the contacts 132, which in turn control the energizing circuit 133 for the coil 33 of the magnetic gripping device 29. The arrangement is such that when the transfer mechanism concludes movement of the line of cartons from one position to the next, contacts 129 are momentarily closed to start the powder filling means 15 in operation. Cam 128 is rotated in such a timed relationship with the transfer mechanism that during a transfer operation switch 132 is closed to energize the gripping device 29, but for a short interval while the cartons are at rest, gripping device 29 is de-energized to permit a weighing operation.

Operation of our apparatus can now be described as follows: It will be assumed that the machine is in continuous operation, and that the cartons 14 are being progressed step by step along the conveying line. As the open cartons reach the filling station, the powder feed means 15 is operated to deliver a measured amount of powder to the carton. The exact amount of this powder is determined by the positioning of the rod 100, which in turn is controlled by the motor 12. While this carton is being filled, another carton is at the weighing station, upon the weighing platform 13. While the filled carton is upon the platform 13 the gripping device 29 is de-energized for a short period of time, thus permitting the weighing device to function. During the interval that the gripping device 29 is de-energized, the platform 13 takes a balanced position depending upon the weight of the powder in the carton, and depending upon the volumetric displacement of mercury by the float in order to assume a balanced position. The inductances 21 and 22 thereupon assume certain values of inductive impedance, depending upon the positioning of the armature 23. The phase of current supplied to the amplifier 73 by the control circuit 79 is modified accordingly, and this serves to energize the motor 87 to cause rotation of shaft 83 one direction or the other, to adjust the contact arm 77 of the resistance 74, until a bridge balance is re-established.

Rotation of shaft 83 in order to establish a balance corresponding to the weight of the carton, serves to position cams 84, 85 and 86. As illustrated in Figure 1 the shaft 83 has a position intermediate extreme angular positions. For a substantial amount of angular movement one direction or the other from this mean position, as for example over a total angular movement of about 60°, neither one of the two cams 84 or 85 operates its corresponding switch 91 or 92. However when these allowable limits are exceeded, one or other of the switches 91 or 92 is operated. If the carton is underweight switch 91 is operated, and if the carton is overweight, switch 92 is closed. Closing of switch 91 energizes the winding of relay 96, and at the same time supplies current to the motor 12 which is 90° out of phase with a reference frequency, whereby this motor is caused to move the rod 100 a predetermined amount depending on the period that switch 91 is closed. The amount of this repositioning, i. e. the amount of movement of the rod, is dependent upon the amount that the weighed carton exceeds the allowable limits, and serves to change the rate of drive of the feed screw 116 whereby a correction is made in the rate of feed.

If the carton is overweight then switch 92 is closed by the rotation of shaft 83 to establish a balance, and this serves to energize the relay 97, and to operate the motor 12 to reposition the rod 100 accordingly. However, it is apparent from Figure 1 that this change in the rate of feed by feed screw 116 is only effective for cartons subsequent to the one being weighed and not for the carton actually being weighed. When the underweight or overweight is relatively great with respect to the desired weight, switch 93 is opened by disengagement from cam 86, and this serves to operate the relay 98, and to operate the reject solenoid 110 whereby when this particular carton is moved from the filling station, it is dislodged from the conveying line, or in other words is rejected.

The amount of correction imparted by the motor 12 is automatically varied in accordance with the amount of overweight or underweight. This is because shaft 83 may overtravel in either direction after closing either 91 or 92, and its return to neutral position occurs only after a carton is received which has the desired weight. Actually however the variation is substantially less, as for example about 50% of the underweight or overweight as indicated by the positioning of the shaft 83. This serves to avoid overcorrection or hunting.

Our apparatus is capable of relatively high speed operation to a high degree of accuracy. The weighing means is of high sensitivity but is capable of operating to obtain an accurate weight in a short interval of time.

We claim:

1. In an automatic filling and weighing machine of the type having carton conveying means for intermittently progressing cartons through a filling station and a weighing station and in which adjustable feed means serves to adjust the quantity of products supplied to each of the cartons at the filling station, a weighing platform at the weighing station serving to support the cartons, weighing means serving to support the platform, an electrical bridge of the inductive-impedance type responsive to said weighing means, means including an electric motor serving to effect adjustment of said filling means to thereby adjust the quantity of material supplied to the cartons, an electrical network serving to operate said electrical motor, a plurality of switches serving to control said network, means including a single member movable in opposite directions serving to operate said switches, means including a second electric motor serving to position said member responsive to phase changes developed across said bridge, and means operated by said second electric motor serving to automatically re-establish an electrical balance in said bridge after the electrical balance has been disturbed by said weighing means.

2. In an automatic filling and weighing machine of the type having carton conveying means for intermittently progressing cartons through a filling and a weighing station and in which adjustable feed means serves to adjust the quantity of the product supplied to each of the cartons at the filling station, a weighing platform at the filling station serving to support the cartons at the weighing station, weighing means serving to support the platform, an electrical bridge of the inductive-impedance type responsive to said weighing means, voltages between points on said bridge being dependent upon the weight of the carton at the weighing station, means including a reversible electric motor serving to effect adjustment of the filling means, an electrical network to energize said electric motor, a pair of electrical switches serving to control said network, operation of one of said switches serving to cause the network to operate said electric motor to increase the rate of feed to the cartons, and operation of the other of said switches serving to cause the network to operate said electric motor to decrease the rate of feed to the cartons, means including a single member movable in opposite directions serving to effect selective operation of either one of said switches, means including a second reversible electric motor serving to move said member, an electrical means responsive to phase changes developed across said bridge serving to operate said second electric motor, and means operated by said second electric motor serving to automatically re-establish an electrical balance in said bridge after the electric balance has been disturbed by said weighing means.

3. In an automatic filling and weighing machine of the type having carton conveying means for intermittently progressing cartons through a filling and a weighing station and in which adjustable feed means serves to adjust the quantity of products supplied to each of the cartons at the filling station, a weighing platform at the weighing station serving to support the cartons at the weighing station, weighing means serving to support the platform, an electrical bridge of the inductive-impedance type responsive to said weighing means, voltages developed between the points on said bridge being dependent upon the weight of a carton on the weighing platform, means including an electric motor serving to effect adjustment of the filling means, an electrical network serving to energize said electric motor, two electrical switches connected in said network, operation of one of the two switches serving to cause the network to operate said electric motor serving to increase the feed of material to the cartons, and operation of the other of the two switches serving to cause the network to operate said electric motor to decrease the supply of material to the cartons, means serving to reject a carton as it progresses from the weighing platform, means including a third electrical switch to effect operation of said carton rejecting means, means including a single operating member movable in opposite directions to effect operation of all three of said switches, an intermediate position of said member serving to condition said switches whereby said electric motor does not change adjustment of said feed means, movement of said member for a limited distance in one direction serving to operate one of said two switches whereby the electrical network energizes said electric motor to increase the rate of feed to the cartons, movement of said member for a limited distance in the opposite direction serving to operate the second one of said two switches to cause the network to energize said electric motor to thereby decrease the rate of feed to the cartons, movement of said member for greater distances in either direction serving to operate said third named switch to cause said rejecting means to be energized, means including a second electric motor to operate said member, electrical means responsive to voltages developed across said bridge serving to energize said second electric motor, and means operated by said second electric motor serving to automatically re-establish an electrical balance in said bridge after the electrical balance has been disturbed by said weighing means.

4. In an automatic filling and weighing machine of the type having carton conveying means for intermittently progressing cartons through a filling station and a weighing station and in which adjustable feed means serves to adjust the quantity of the product supplied to each of the cartons at the filling station, means including an electric motor to control the rate of drive of the filling means, an electrical network to energize said electric motor, two electrical switches connected in said network, operation of one of the switches serving to cause the network to operate said electric motor to increase the rate of drive of the filling means, operation of the other of the switches serving to cause the network to operate the electric motor to decrease the rate of drive of the filling means, a weighing platform at the weighing station to support the cartons at the weighing station, weighing means to support the platform, an inductance-resistance bridge responsive to said weighing means, voltages developed between points on said bridge being dependent upon the weight of the carton on the weighing platform, electrical means responsive to said voltages, means including a second electric motor energized by said electrical means, a shaft driven by said second of the electric motors, a pair of cams mounted on said shaft and having a spaced relationship which corresponds to allowable ranges between overweight and underweight cartons, said cams serving to operate said switches upon substantial movement of said shaft, said spaced relationship along limited movement of said shaft about an intermediate point, substantial movement of said shaft in one direction serving to cause one of said cams to operate one of said switches whereby the electrical network energizes said first named electric motor to increase the rate of feed to the cartons, and substantial movement of said shaft in the opposite direction to cause the other of said cams to operate the other of said switches whereby the electrical network energizes said electric motor to decrease the rate of feed to the cartons.

5. A device as in claim 4 together with means to automatically re-establish an electrical balance in said bridge after the electrical balance has been disturbed by said weighing means, said means comprising a potentiometer in said inductance-resistance bridge, said potentiometer being driven by the shaft which is driven by said second electric motor.

6. A device as in claim 5 together with means to reject a carton as it passes from the weighing platform if it is greatly overweight or underweight, said means comprising a third cam on said shaft, a switch actuated by said cam, and rejecting means actuated by said switch.

References Cited in the file of this patent

UNITED STATES PATENTS

| Number | Name | Date |
|---|---|---|
| 1,104,268 | Messiter | July 21, 1914 |
| 2,037,484 | Raymer et al. | Apr. 14, 1936 |
| 2,050,496 | Mayo | Aug. 11, 1936 |
| 2,081,367 | Nicolson | May 25, 1937 |
| 2,108,575 | Benedict | Feb. 15, 1938 |
| 2,154,375 | Chambers | Apr. 11, 1939 |
| 2,323,023 | Flanagan | June 29, 1943 |
| 2,354,087 | Raymer | July 18, 1944 |
| 2,371,040 | Fisher et al. | Mar. 6, 1945 |
| 2,462,216 | Nowak | Feb. 22, 1949 |
| 2,503,295 | Palmer | Apr. 11, 1950 |
| 2,547,750 | Hall | Apr. 3, 1951 |